United States Patent [19]

Whitney

[11] 4,048,528
[45] Sept. 13, 1977

[54] STARTING MOTOR FOR LARGE INERTIA LOAD

[75] Inventor: Eugene C. Whitney, Forest Hills, Pa.

[73] Assignee: Westinghouse Electric Corporation, Pittsburgh, Pa.

[21] Appl. No.: 621,993

[22] Filed: Oct. 14, 1975

[51] Int. Cl.² .......................... H02K 9/19; H02K 7/02
[52] U.S. Cl. ........................................ 310/54; 290/52;
310/61; 318/161; 322/13; 165/86
[58] Field of Search ................ 290/52; 322/13, 9, 10;
310/52, 53, 54, 58, 64, 261, 157; 318/161, 408,
419; 165/86

[56] References Cited

U.S. PATENT DOCUMENTS

| | | | |
|---|---|---|---|
| 2,023,326 | 12/1935 | Kilbourne | 318/408 |
| 2,542,296 | 2/1951 | Storsand | 318/419 X |
| 3,189,769 | 6/1965 | Willyoung | 310/52 |
| 3,470,404 | 9/1969 | Agerman et al. | 310/157 X |
| 3,543,038 | 11/1970 | Putz et al. | 290/52 X |
| 3,765,480 | 10/1973 | Fries | 310/54 X |

Primary Examiner—Robert J. Hickey
Attorney, Agent, or Firm—G. H. Telfer

[57] ABSTRACT

A large starting motor is provided, especially for reversible, pumped storage water wheel generator-motor units, having a rotor member which comprises a relatively thin ferromagnetic rim and a closed container of cooling fluid disposed adjacent and radially inward thereof. Heat developed due to circulation of starting currents within the rim is conducted to the cooling fluid through the inside diameter surface of the rotor rim. Provision is made for venting and replenishing the cooling fluid which heats up and in extreme cases vaporizes in response to the thermal energy transferred from the rim.

16 Claims, 9 Drawing Figures

STARTING MOTOR FOR LARGE INERTIA LOAD

BACKGROUND OF THE INVENTION

1. Field of the Invention

The present invention relates to dynamoelectric machines such as large induction motors, and more particularly this invention relates to an induction motor for driving large inertia loads having a hollow ferromagnetic rotor and means for transferring heat therefrom.

2. Description of the Prior Art

Various methods are available for starting reversible pumped storage generator-motors. One method currently used is by means of a starting motor which is mounted directly on the main machine shaft. In such an arrangement a large wound rotor motor is often used. This motor is rather expensive and requires a rheostat (usually a water rheostat) to dissipate the energy involved during starting. This energy is, as a minimum, equal to H.KVA of the large machine being started where H is the inertia constant in KW seconds per KVA stored energy of rotation. This is further increased by the speed difference of the wound rotor induction motor synchronous speed compared to the rated speed of the large synchronous motor. It is also increased by the torque required to overcome friction and windage losses in both the generator motor and pump compared to the torque which is directly applied to the inertia for acceleration.

The rotor assemblies for starting motors suitable for use with hydrogenerators are relatively large in physical size and, although they rotate at relatively low speeds., their large diameter and great weight result in moderately high centrifugal forces at the periphery of the rotor during operation. The rotational forces in combination with the differential heating caused by the circulation of heavy induced currents during starting make the ordinary squirrel cage rotor assembly unsuitable for this application since the rotor bars tend to heat and expand unevenly and cannot withstand the large mechanical and thermal stresses.

The mechanical and thermal problems involved in this type construction have been increasingly severe, and alternative starting arrangements such as asynchronous starting at full or reduced line voltage have been utilized. However, the disturbing effects of large current inrush on the interconnected network and heating of the damping windings are sometimes encountered when the asynchronous starting method at full or reduced line voltage is used, so that satisfactory designs of the this type are not always possible.

SUMMARY OF THE INVENTION

In accordance with the present invention, an induction motor is provided which is suitable for driving a large inertia load and is especially suited for starting a reversible, pumped storage hydrogenerator-motor with the starting induction motor mounted on the main machine shaft.

The invention provides an induction motor having a generally conventional stator assembly and a rotor which comprises a continuous circular metallic rim for dynamic interaction with the magnetic field established by the stator assembly and a closed container of cooling fluid having a large thermal capacity for transferring heat from the rim during starting periods. The rim is generally cylindrical and is formed of high strength steel of suitable thickness and length. The rotor assembly operates with an air gap which is generally larger than normal as compared to the air gap of an equivalent wound rotor motor to allow for radial expansion of the rim in response to temperature changes. Because the amount of heat to be stored in the rotor for starting large generator-motor units is more than can be safely stored on such a thin steel rim, particularly when several starts are required in a short time (generally under 2 to 4 hours), a container of cooling fluid is provided on the inside face of the rotor rim so that the cooling fluid will be in direct contact with the rim and will absorb the heat generated whenever the rim is warmer than the cooling fluid. As the rotor speed increases the cooling fluid inertia provides a relative velocity in addition to connection between the cooling fluid and the rotor rim, thus aiding heat transfer.

In the preferred embodiment of the invention, water is used as a cooling fluid in order to absorb a large amount of heat. With a radial water container dimension 3 to 4 times the rim thickness most starts will not heat the water to boiling temperature. If the rim reaches temperatures above 100° C, the water will absorb large amounts of heat as it turns to steam, thus controlling the temperature of the surface of the rim next to the water. The steam is transported toward the center of the rotor due to centrifugal force on the water. The steam either heats the remaining water or escapes through a vent to a desired location via a hose or pipe to an area preferably outside the machine where it cannot cause harm. By this method the volume of water compared to the volume of the rim can be kept within practical dimensions and a great deal of heat can be absorbed without an expensive water rheostat as described above.

Since this type of application normally has a load torque curve which is nearly proportional to speed squared due to windage and pump losses, it is desirable to limit the rate of heat input to the rotor during low speed operation. A small depth of flux penetration into the rotor is necessary to accomplish this at low speed. This is obtained in the present invention by controlling the impedance of the stator winding of the induction motor during the starting mode whereby polyphase currents flowing in the stator winding are reduced during low speed operation and are increased as the starting motor rotor approaches a predetermined synchronizing speed. Heat buildup in the rotor rim is greatly minimized and the stresses due to thermal cycling are maintained sufficiently below the yield point of the rim material thereby providing satisfactory starting during a reasonably short time period. In addition, means are provided for changing the cooling fluid on a slow replacement or recirculation basis and for cooling it by means of a small external heat exchanger at a rate which is not necessarily sufficient to accommodate the total losses during the starting period, but which is sufficient to remove most of the stored heat before another start. Thus the starting motor of the present invention can provide multiple starts in a single day for many years without risk of heat damage.

The foregoing and other objects, advantages, and features of this invention will hereinafter appear, and for purposes of illustration, but not of limitation, an exemplary embodiment of the subject invention as shown in the appended drawing.

DESCRIPTION OF THE PREFERRED EMBODIMENT

Figure 1:
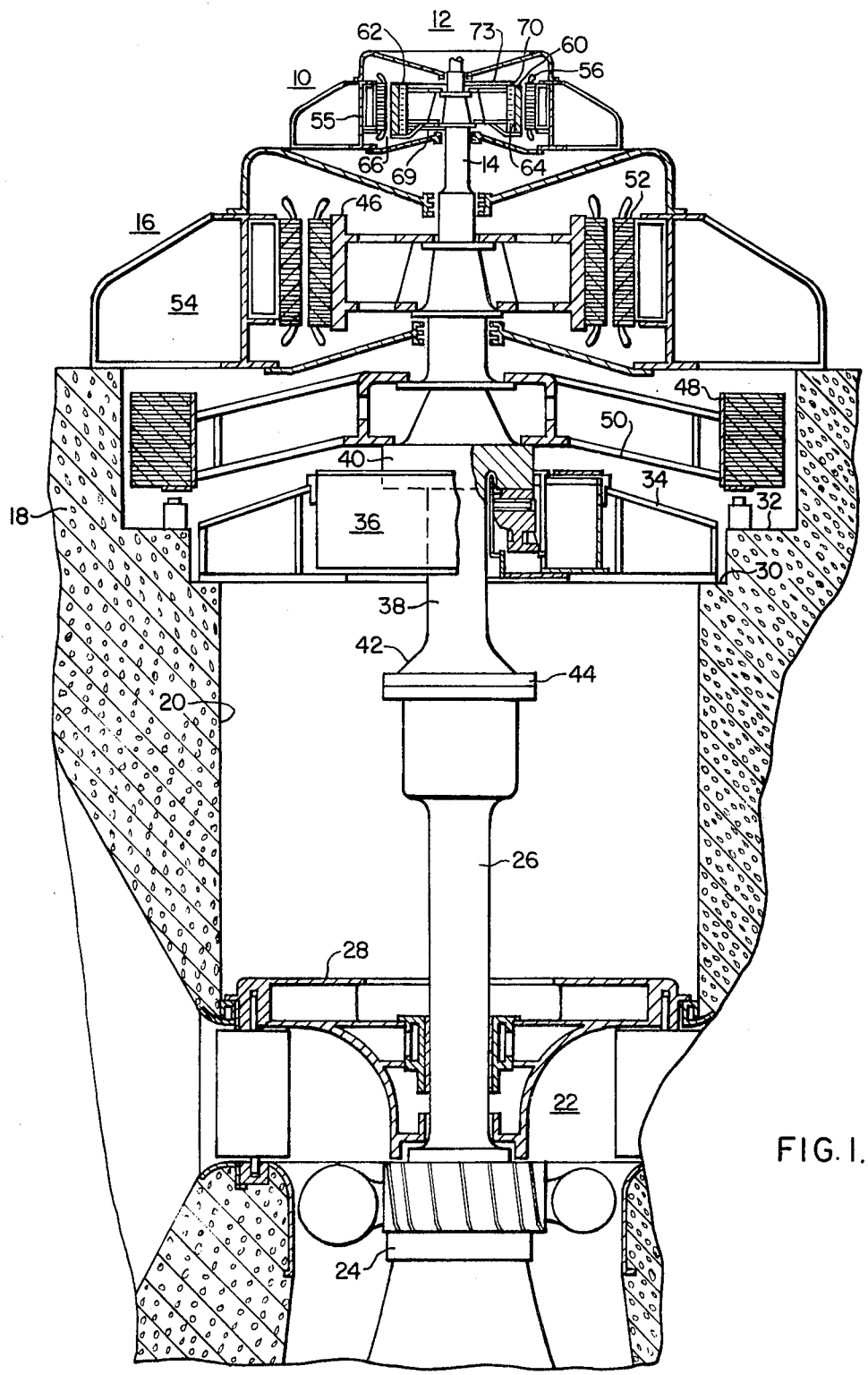
FIG. 1 is a simplified vertical sectional view, with some parts in elevation, of a vertical-shaft water wheel generator assembly and a starting motor which incorporates the present invention mounted on the shaft in operating position.

The invention as shown in the drawing is embodied in an induction motor which is mounted in operating position upon the shaft of a large reversible pumped storage hydrogenerator-motor unit. A starting motor which incorporates the invention is especially well suited for starting large inertia loads and therefore may find utility in related applications.

Referring first to FIG. 1, there is shown a large induction starting motor 10 which has a rotor assembly 12 constructed according to the teachings of the present invention and which is mounted in operating position upon a shaft 14 for concurrent rotation with the rotor of a large vertical shaft water wheel or hydraulic turbine assembly 16 which includes a foundation 18 and a pit 20. A vertical shaft water wheel or hydraulic turbine 22 is mounted within the pit 20, the water wheel having parts, such as a rotor 24, shaft 26, and head cover 28, which are vertically removable via being lifted out of the pit 20. The foundation 18 has a bearing supporting ledge portion 30, and a brake and jack supporting ledge portion 32, both of the ledge portions being above the pit.

The bearing supporting ledge 30 supports a thrust bearing supporting bracket 34, which carries a thrust and guide bearing assembly 36 which supports a vertical generator shaft 38 in any suitable manner. The generator shaft 38 has an upper shaft portion 40 and a lower shaft portion 42, respectively extending above and below the thrust bearing 36. The downwardly extending shaft portion 42 terminates in a coupler 44 for coupling the same to the water wheel shaft 26.

The upper shaft portion 14 of the generator assembly 16 carries a generator rotor 46 which is spaced above and separate from a flywheel 48 and its spider supporting assembly 50. The generator rotor 46 is surrounded by a generator stator 52, the periphery of which is provided with a suitable supporting means such as the structural supporting assembly 54 which is supported on an upper part of the foundation 18, so that the stator and rotor may operate independently with respect to each other.

The upper shaft portion 14 of the generator also carries the starting motor rotor assembly 12 of the starting motor 10 for concurrent rotation with the rotor 46 of the generator assembly 16. The starting motor rotor 12 is surrounded by a starting motor stator 56, the periphery of which is provided with suitable support by means of a vertical extension 55 of the structural supporting assembly 54.

The purpose of the starting motor 10 is to bring the rotor 46 of the generator assembly 16 up to synchronous speed during starting in either the pumping mode or the generating mode. Therefore the starting motor rotor 12 is mounted directly to the shaft 14 for concurrent rotation with the rotor 46 of the generator assembly. During starting, large starting currents are circulated in the starting motor rotor 12 which generates a large amount of thermal energy which is generally proportional to the inertia of the rotor assembly and its resistance torque. This heat must be dissipated within the mass of the rotor assembly or must be evacuated to limit the temperature gradient and the accompanying mechanical stresses to values compatible with good behavior of the machine. As the thermal energy dissipated per unit of rotor surface area increases, rotor assemblies which utilize conventional construction including rotor bars or solid pole members become subject to physical expansion due to temperature differentials within the rotor structure, therefore making such arrangements unsuitable. Therefore, improved rotor construction is desirable for applications involving high energy starting levels or shorter starting periods.

Figure 2:
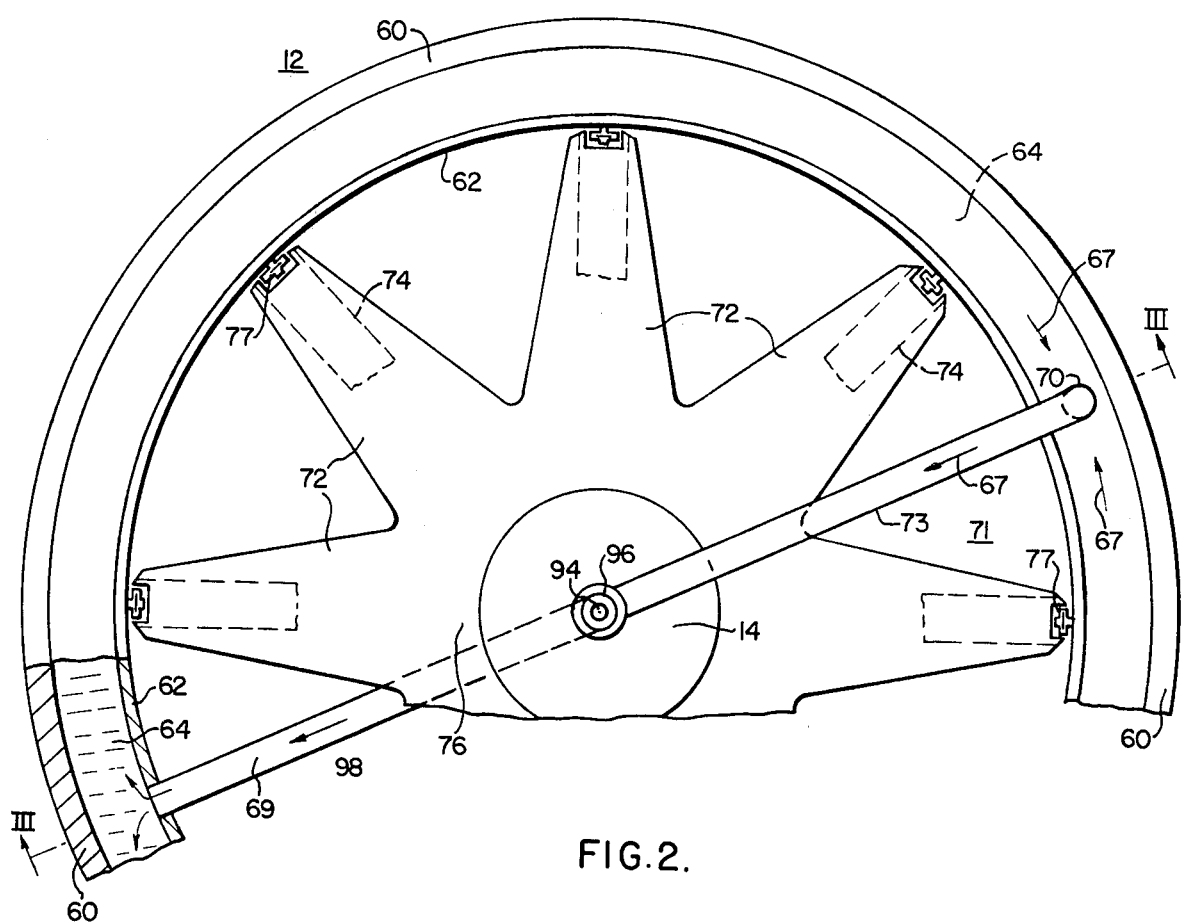
FIG. 2 is a plan view of the rotor assembly of the starting motor illustrated in FIG. 1.
Figure 3:
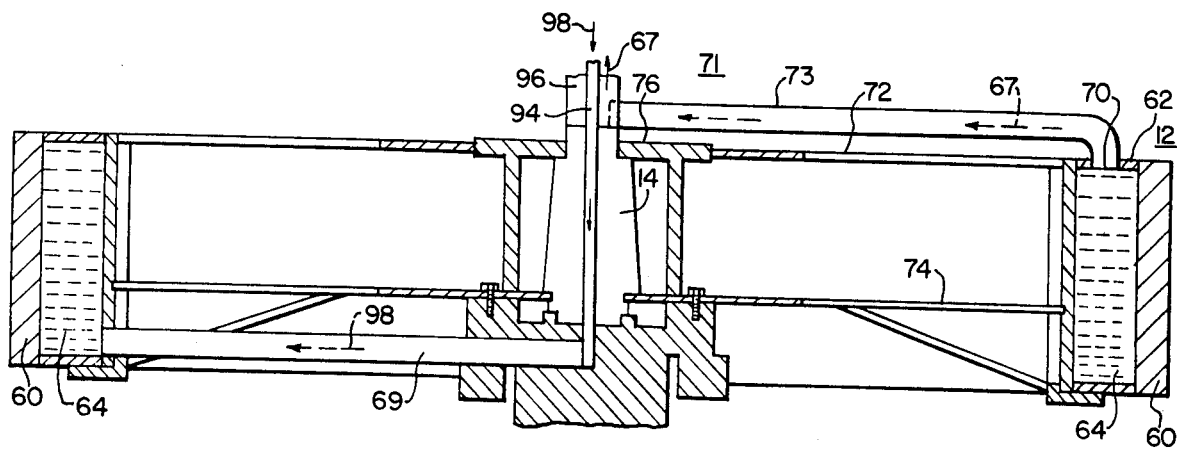
FIG. 3 is a sectional view substantially on the line III—III of FIG. 2.

According to the present invention, as illustrated in FIGS. 1, 2, and 3, the rotor assembly 12 is provided with a continuous circular metallic rim 60 to which a closed container 62 of a suitable cooling fluid 64, such as water, is connected so that the cooling fluid is in thermal communication with the inside diameter of the rim 60 to transfer thermal energy therefrom. A cooling fluid other than water may be used to good advantage. It is preferred that the cooling fluid 64 be in intimate contact with the inside diameter of the surface of the rim 60 for maximum heat transfer purposes. Because of the unusually high level of heat generated during the starting mode, the rotor assembly 12 should have a very large thermal capacity; thus, the volume of the cooling fluid 64 should be large as compared with the volume of the metal comprising the rim 60.

The stator member 56 of the starting motor 10 may be similar to that of a conventional wound rotor motor or of a squirrel cage motor. The rotor 60, however, is a continuous cylindrical rim of suitable strength steel of suitable thickness and length operating with an air gap 66 which is generally larger than normal for a corresponding conventional wound rotor or squirrel cage motor. The large energy storage (in the form of heat) in the rotor 12 of the starting motor 10 is more than the relatively thin rim 60 can store, particularly when several starts are required in a relatively short time (under 2 to 4 hours). Therefore, the water chamber 62, or "water tank" is formed on the inside diameter surface of the rotor rim 60 so that the water 64 is in direct contact with the rim and absorbs the energy transmitted thereto whenever the rim 60 is warmer than the water. As the speed of rotation increases, the inertia of the water 64 will cause a relative velocity between it and the rotor rim, thus aiding heat transfer. As the rim 60 reaches temperatures above 100° C the water will absorb large amounts of heat as it turns to steam, thus controlling the temperature of the surface of the rim next to the water. As the water vaporizes, steam 67 moves toward the center of the rotor 12 due to centrifugal force on the water and to the top of the water chamber 62 and either heats the remaining water or escapes through a vent 70 to a desired location by conduit means 73 such as a hose or pipe to an area preferably outside the machine where it will not cause harm.

It is known that conventional rotors cannot operate for extended periods under heavy load conditions because the practical heat dissipation rates in such structures will cause high temperature differences with resultant stresses in the rotor above its yield point. Whenever this is true the rotor is only good for a limited number of cycles or starts before thermal checking or cracks start to occur in the heated surface which progress to the point of destruction. However, with a thin rim of suitable thickness and of moderate yield point steel, and with the temperature held reasonably uniform by cooling fluid and a suitable length of rim to stator, the stresses can be maintained sufficiently below the yield point of the rim material to be good for starting several times a day on the average for 20 to 30 years.

Referring now to FIGS. 2 and 3, the rotor 12 has a metallic web supporting member 71 secured between the shaft 14 and the cooling fluid container 62 to support the rim 60 and water tank 62 for rotation within the stator member 56. The web supporting member 71 as illustrated has the general outline of a spider member with a plurality of radial arms 72 which are reinforced by suitable structural members 74. The spider member 71 has a fabricated hub portion 76 which is suitably secured to the shaft 14 for rotation therewith. The cylindrical water tank 62 is supported on the outer ends of the radial arms 72, and the solid rotor rim 60 is secured to the water tank 62 by any suitable means such as welding.

As previously discussed, the high temperatures as well as the large diameter and great mass of the rotor of this type results in high rotational forces on the rim 60 when it is rotating and conducting current during the starting mode. To accommodate radial expansion of the rotor assembly 12, the cylindrical rotor assembly 12 is connected to the shaft 14 by means of the arm members 72 which are joined to the inside diameter of the water tank 62 by means of resilient spring key connecting assemblies 77. The amount of spring deflection within the spring connecting means 77 and the load on the rim 60 and the spider 71 can all be varied as necessary, thus providing considerable flexibility in design.

Figure 6:
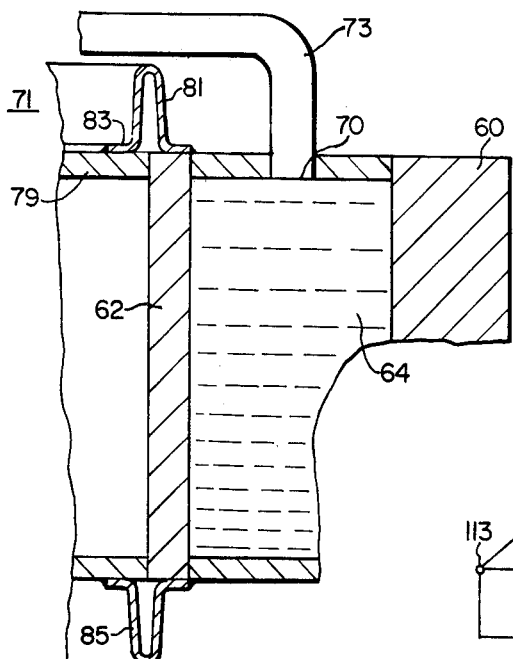
FIG. 6 illustrates an alternative embodiment of a resilient supporting arrangement for the rotor assembly of the starting motor of FIG. 1.

An alternate resilient supporting arrangement is illustrated in FIG. 6 of the drawing. In this assembly, the inside rim of the water tank 62 is fitted around a pair of axially spaced, radially extending circular plate members 79 and is joined thereto by a pair of annular spring members 81, 85. The plate members 79 are suitably joined to the shaft 14 and are braced to limit axial deflection. The annular spring members 81, as illustrated, preferably has a cross-section in the form of an inverted "U", with lip portions 83 welded or otherwise suitably joined to the radial plate 79 and tank 62. The inside rim of the water tank 62 is preferably secured to the plate members 79 by heat shrinking to moderate the stress imposed by thermal expansion. This assembly provides a flexible diaphram which is tangentially stiff for the transmission of torque, but which is radially resilient to allow uniform radial expansion of the rim 60 as its temperature increases.

The performance of the induction motor 10 having a hollow, continuous ferromagnetic rim rotor structure 60 may be characterized by the electromagnetic torque resulting from eddy currents of such a rotor reacting with an inducing field from the stator 56. These eddy currents are known to have a distribution and a definite depth of penetration beyond which the field quantities are negligibly small. It has been found that hollow ferromagnetic rotors with a radial wall thickness corresponding to substantially the depth of penetration of the eddy currents compares favorably in performance with a solid rotor of identical material and the same air gap. Thus for improved performance the radial thickness of the rim 60 may be constructed substantially equal to the maximum depth to which eddy currents induced therein by the stator 56 are capable of penetrating. However, the proper rim thickness is also determined by the requirements of thermal capacity and flux capacity. If the rim is too thick, thermal differential effects may cause it to rupture. But it must be thick enough to provide sufficient flux capacity to achieve adequate pull-in torque. It has been determined that a rim thickness (for high strength steel) of $1\frac{1}{2}$ to 3 inches satisfies these requirements for typical pumped storage applications.

Figure 4:
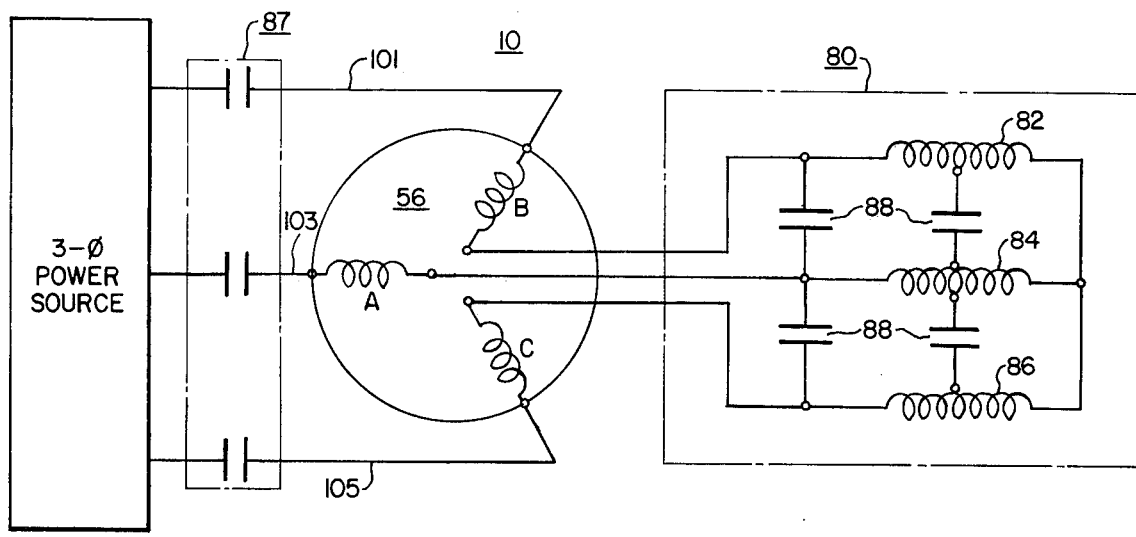
FIG. 4 is an electrical schematic diagram of the stator assembly of the starting motor illustrated in FIG. 1 in which a reactor is connected.

For large inertia loads, the output of an induction motor can be characterized by a load torque curve which is nearly proportional to speed squared due to windage and pump losses. Therefore it is desirable to limit the rate of heat input to the rotor 12 at low speeds and small depth of flux penetration. This may be achieved in the present invention by introducing impedance control means into the stator winding 56 of the starting motor 10 as illustrated in FIG. 4 of the drawing. The winding 56 comprises phases A, B, and C which receive power from a three phase source through a suitable contactor 87 and transmission lines 101, 103, and 105. The preferred impedance control means comprises a polyphase saturable reactor 80 which is connected in series electrical relationship with the neutral of the polyphase stator winding 56. The saturable reactor 80 includes a plurality of impedance elements 82, 84 and 86 which may be trimming reactors or resistors which are switched in and out of the circuit by means of contactor switching elements 88 which may be selectively energized and coordinated for progressively bypassing the impedance elements as the starting motor rotor speed increases. Therefore, from rest to a suitable speed of 40% to 80% of synchronous speed, the maximum reactor impedance may be inserted into the neutral of the stator winding 56. Then with low slip near synchronous speed, where the flux can penetrate deeper in the rim without excessive loss rates, the reactor 80 may be shorted out in one or several steps to produce much higher torques to overcome the losses in the generator motor unit to reach a suitable synchronizing speed. The synchronous speed of such an induction starting motor is usually close enough to the main unit rated speed, and the acceleration rates are low enough, that manual or automatic synchronizing can be readily employed.

While FIG. 4 shows the reactor 80 connected in the neutral of the stator winding 56, the reactor could also be placed in the line side with slightly different switching so that one reactor could serve a number of starting motors in a multiple unit station.

Figure 8:
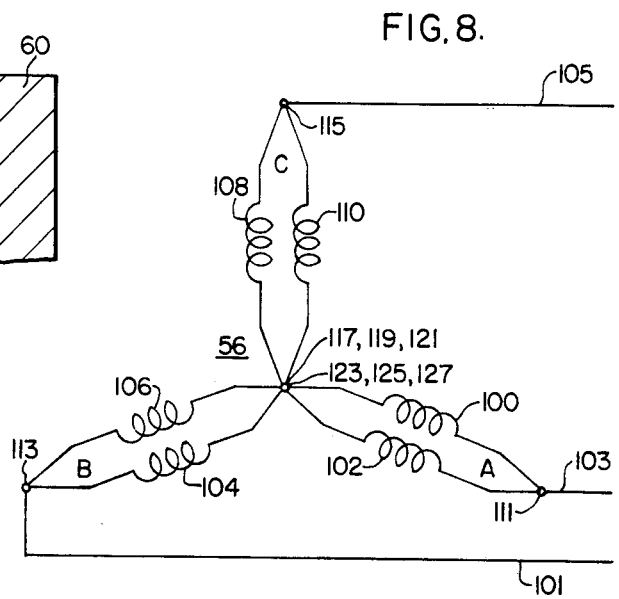
FIG. 8 is a circuit diagram of an alternative embodiment of the stator winding of the starting motor of FIG. 1; shown in unmodulated condition.
Figure 9:
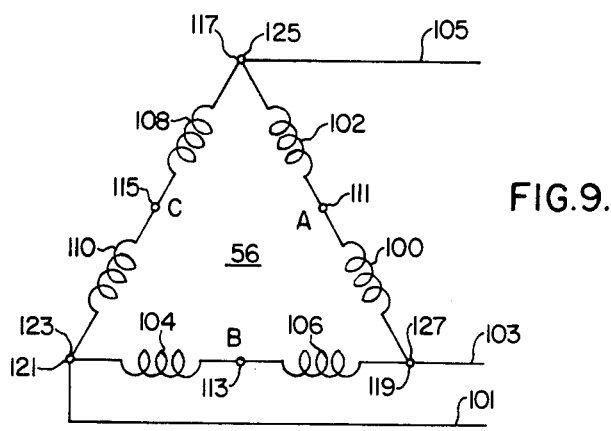
FIG. 9 is a circuit diagram of the winding of FIG. 8 shown in reconnected, modulated condition.
Figure 7:
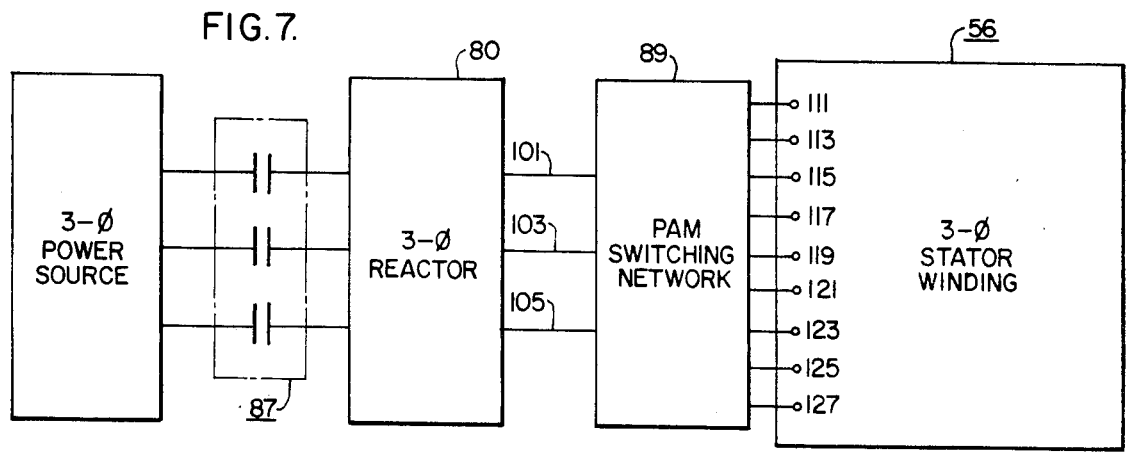
FIG. 7 is a block diagram which illustrates an alternative winding energizing arrangement for the starting motor of FIG. 1.

As a further means of limiting the heating rate of the rotor 12 during starting, the stator winding 56 of the starting motor 10 is provided with suitable coil connecting points and suitable switching means 89 so that it can be connected to provide alternative pole numbers and thereby reduce its synchronous speed and also increase starting torque. This arrangement may be realized by a standard two-speed winding combination, or by a more sophisticated winding connection arrangement known as pole-amplitude modulation as shown in FIGS. 7, 8, and 9. A number of patent specifications and technical articles explain this method, including G. H. Rawcliffe, "Induction Motor Speed Changing by Pole Amplitude Modulation," Proceedings of the Institution of Electrical Engineers, Vol. 105, Part A, No. 22, Aug. 1958; and, G. H. Rawcliffe, "Speed Changing Induction Motors — Further Developments in Pole-Amplitude Modulation," Proceedings of the Institution of Electrical Engineers, Vol. 107, Part A, No. 36, Dec. 1960. The control of speed by pole manipulation may be practiced either independently or in conjunction with reactor impedance control to limit the heating rate of the rotor rim 60 during starting.

Figure 5:
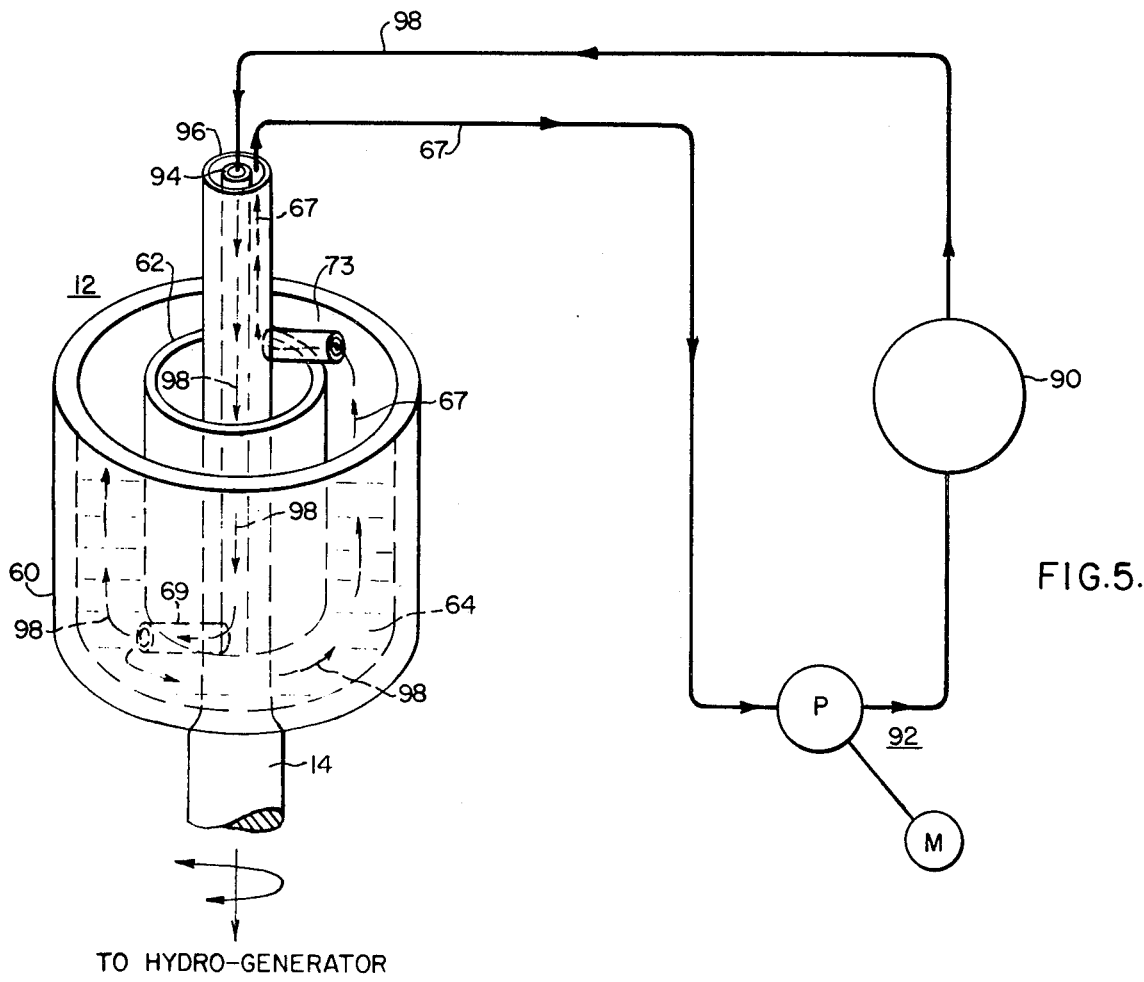
FIG. 5 is a schematic diagram of an external cooling arrangement for the rotor of the induction starting motor of FIG. 1.

A further improvement in the cooling of the rotor assembly 12 is illustrated in FIG. 5 in which the cooling fluid is replaced by cooling fluid pumped from an external reservoir or heat exchanger 90. The cooling fluid 64 is introduced into the tank 62 through a conduit 69 and is transferred therefrom through the conduit 73 to the heat exchanger 90 by means of a pump assembly 92. The cooling fluid is preferably introduced and discharged through a pair of concentric coolant tubes 94, 96 extending through the central bore of the shaft 14 in the conventional manner. Circulation of the cooling fluid 64 throughout the tank 62 is illustrated by the arrows 98. The cooling fluid is preferably cooled or exchanged externally on a slow replacement or recirculation basis which may not necessarily be sufficient to take care of the total loss incurred during the starting period, but preferably is sufficient to remove the total accumulation of heat before another start is attempted. Circulation of the cooling fluid within the tank 62 may be improved by suitably arranging discharge nozzles (not shown) within the tank 62. By this arrangement, cool down time of the rotor rim 60 can be reduced substantially so that multiple starts can be made within a relatively short time without risk of rotor damage.

It will now be apparent that the invention provides a robust motor assembly which includes a continuous solid rim and a water tank for transferring heat energy therefrom. Bar expansion problems due to differential heating of the rotor are avoided in the continuous solid rim construction. The large heat capacity of the cooling fluid disposed in heat transfer relation with the inside diameter of the rim insures that the temperature of the rim will be held reasonably uniform and that the stresses will be maintained sufficiently below the yield point of the rim material for multiple starts within a relatively short time period.

Although a particular embodiment of the invention has been shown and described for the purpose of illustration, it will be apparent that other embodiments and modifications are possible within the scope of the invention.

I claim:

1. An induction motor having a rotor disposed for rotation within an annular stator, said rotor comprising:
    a continuous circular metallic rim serving as a rotor winding;
    a closed container of cooling fluid disposed adjacent and radially inward of said rim, said cooling fluid being in thermal communication with said rim to transfer thermal energy therfrom; and a shaft concentrically disposed within said rim, a metallic web secured to said shaft for supporting said rim for rotation within said stator, said web being resilient to permit radial expansion of said rim in response to temperature changes therein.

2. The combination as defined in claim 1, including means for venting vaporized cooling fluid from said container.

3. The combination as defined in claim 1, including means for replenishing said cooling fluid which vaporizes in response to thermal energy transferred from said rim.

4. The combination as defined in claim 1, including means for circulating said cooling fluid from said container through an external heat exchanger and back to said container.

5. The combination as defined in claim 1, including means for replacing said cooling fluid with cooling fluid of a lower temperature from an external reservoir of said cooling fluid.

6. The combination as defined in claim 1, including a stator member associated with said induction motor, said stator member having a polyphase winding for producing a rotating magnetic field with which said rim portion is magnetically coupled, and means for controlling the impedance of said stator winding during a starting mode, in which said synchronous machine is started and brought up to a desired speed, to cause polyphase currents flowing in said stator winding to be reduced during low speed operation and to be increased as said induction motor rotor approaches a predetermined synchronizing speed.

7. The combination as defined by claim 6, wherein said impedance controlling means comprises a polyphase saturable reactor connected in series electrical relationship with said polyphase stator winding, and coordinated switching means electrically connected thereto for progressively bypassing said reactor as said induction motor rotor speed increases.

8. The combination as defined in claim 1, including a stator member having a polyphase winding wound to provide a first pole number for producing a rotating magnetic field with which said rim portion is magnetically coupled, each phase of said winding including a plurality of coils, said coils having electrical connection points for receiving an electrical current in a cyclical pattern of reconnection, said winding providing an alternative pole number as successive coils of each phase winding are cyclically reconnected and energized.

9. The combination as defined in claim 8 including a source of polyphase alternating current and switching means electrically connected between said source and said winding, said switching means being operable to cyclically reconnect selected ones of said coils in each phase of said winding with said source and to control relative coil polarities during each complete cycle of the applied polyphase alternating current to provide pole-amplitude modulation of said winding.

10. Apparatus comprising:
    a synchronous dynamoelectric machine having a rotor on a shaft and an induction motor in accordance with claim 10 wherein said shaft of said synchronous dynamoelectric machine and said shaft of said induction motor are positioned in axial alignment and are mechanically coupled together for concurrent rotation.

11. The induction motor as defined by claim 1, said cooling fluid being in intimate contact with the inside diameter surface of said rim.

12. An induction motor as defined in claim 1 wherein said web comprises a plurality of radially extending arms, each of said radially extending arms having a recess at its end extending longitudinally of said rotor, and spring means disposed in said recess, said spring means including an elongated spring member having an extension engaging said rim.

13. An induction motor as defined in claim 1, wherein said web comprises a radially extending plate member, said plate member being rigidly secured to said shaft, the inside diameter surface of said container circumscribing the outside diameter surface of said plate member, said plate member being joined to said rotor assembly by an annular spring member, said spring member being U-shaped in cross section and having oppositely disposed lip portions, one of said lip portions being secured to said plate member and one of said lip portions being secured to said rotor assembly.

14. An induction motor as defined in claim 13 in which the rotor assembly is shrunk on the web member to effect a predetermined deflection of said spring member.

15. An induction motor as defined in claim 1, the volume of said cooling fluid being large as compared with the volume of metal comprising said rim.

16. An induction motor as defined in claim 1, the radial thickness of said rim being substantially equal to the maximum depth to which eddy currents induced therein by said stator are capable of penetrating.

* * * * *